(12) United States Patent
Gelbart

(10) Patent No.: US 6,628,435 B1
(45) Date of Patent: Sep. 30, 2003

(54) CONTACT-LESS BALLISTIC SCANNING METHOD

(75) Inventor: Daniel Gelbart, Vancouver (CA)

(73) Assignee: Creo SRL, St. James (BB)

( * ) Notice: Subject to any disclaimer, the term of this patent is extended or adjusted under 35 U.S.C. 154(b) by 608 days.

(21) Appl. No.: 09/618,228

(22) Filed: Jul. 18, 2000

(51) Int. Cl.⁷ .................. G05B 5/01; B23Q 1/25; B23Q 1/23; H04N 1/04
(52) U.S. Cl. .................. 358/496; 358/497; 358/474; 269/55; 269/58; 318/611
(58) Field of Search .................. 358/474, 494, 358/496, 492, 497; 259/55, 58, 71, 73, 289 R; 318/687, 611

(56) References Cited

U.S. PATENT DOCUMENTS

| | | | |
|---|---|---|---|
| 4,245,259 A | 1/1981 | Pick | 358/285 |
| 4,348,697 A | 9/1982 | Takahashi | 358/286 |
| 4,476,496 A | 10/1984 | Thaler | 358/286 |
| 4,750,721 A * | 6/1988 | Sasada | 269/73 |
| 4,764,815 A | 8/1988 | Landsman | 358/293 |

* cited by examiner

Primary Examiner—Edward Coles
Assistant Examiner—Jason Sherrill
(74) Attorney, Agent, or Firm—Oyen Wiggs Green & Mutala

(57) ABSTRACT

In accordance with the present invention a scanning method for flat objects obtains reciprocating ballistic motion without any physical contact between the mutually moving parts, as contact can create particulate matter causing defects. The method ensures that the peak forces attained during scanning are minimized to prevent dislodgement of particulate material and excessive vibration. The method furthermore ensures that both surfaces of flat plate objects be scanned simultaneously.

12 Claims, 2 Drawing Sheets

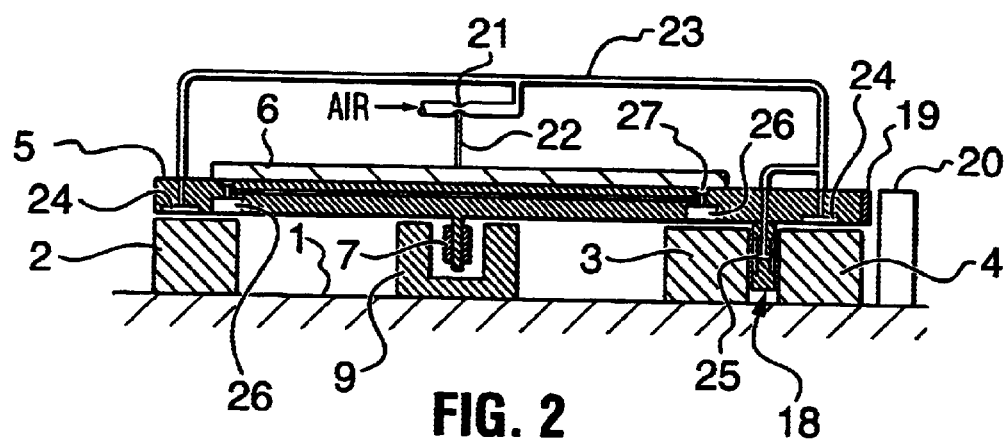
FIG. 2
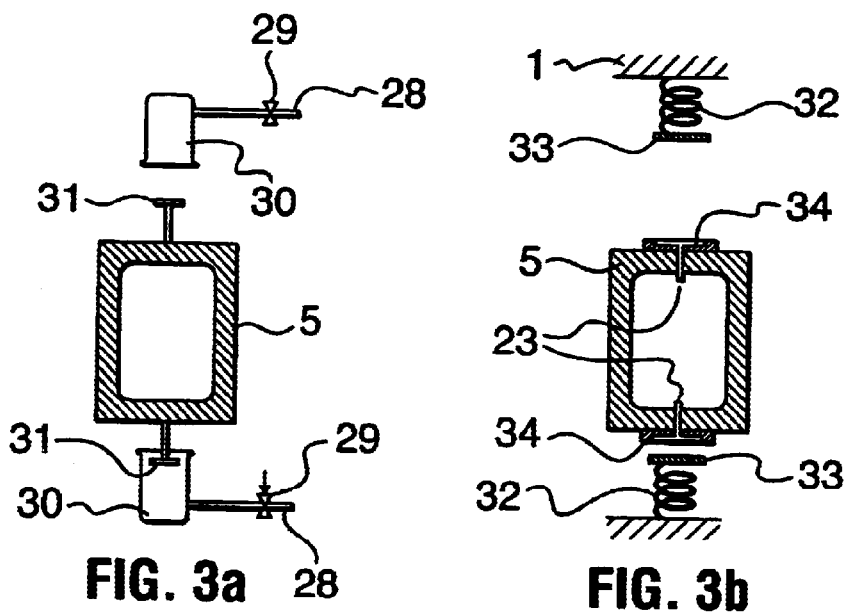
FIG. 3a  FIG. 3b
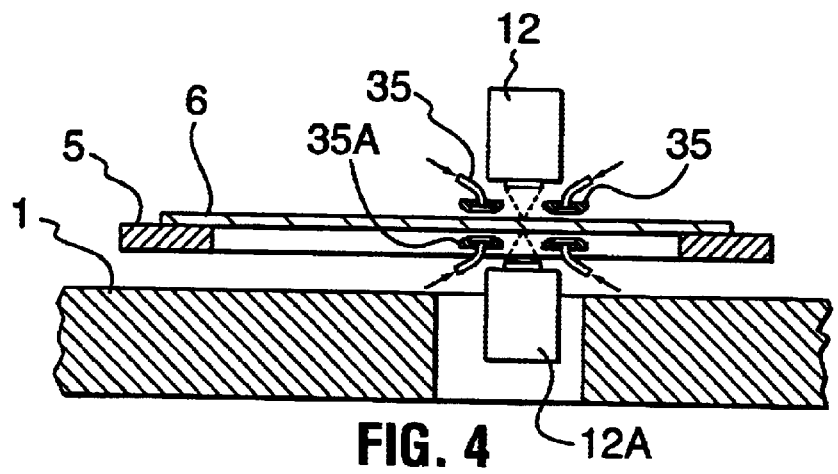
FIG. 4

CONTACT-LESS BALLISTIC SCANNING METHOD

CROSS-REFERENCES TO RELATED APPLICATIONS

None

STATEMENT REGARDING FEDERALLY SPONSORED R&D

Not applicable

REFERENCE TO MICROFICHE APPENDIX

Not applicable

FIELD OF THE INVENTION

The invention pertains to the general field of scanning and in particular to two-dimensional scanning of flat objects.

BACKGROUND OF THE INVENTION

Scanning is a central aspect of many industrial, commercial and technological processes. This is done either to collect information by numerous sensing means, such as in optical scanning where optical data is gathered over a relatively large area, or with and actuator head where the scanning is undertaken with a view to effect an influence on a point by point basis over the area being scanned. The present invention concerns itself with 2-dimensional scanning where there is no physical contact between the scanning device and the object being scanned.

Prior art in the field of has established the practice of ensuring correct two-dimensional positioning of scanning devices by driving the scanning system to predetermined positions based on incremented coordinates in both the X and Y directions. In some cases the object being scanned is placed on a platen and the latter is moved along a 2-dimensional raster path, while in others the scanning head is moved relative to the object to be scanned which is affixed to a stationary platen. Both situations have in common the fact that the control system assumes the coordinates of the position that is scanned or illuminated to be those to which the scanning head or platen has been directed by the control system.

U.S. Pat. No. 4,245,259 teaches an X-Y scanning device in which the coordinates of the scanned point are not predetermined, but instead either the scanning head or the scanned platen moves with respect to the other member in at least one direction in a free running oscillatory shuttle motion, the initial and make-up power being provided by a low inertial motor and the return stroke provided by energy conserving springs of suitable stiffness at the end of the travel of the scanning head. In this case the instantaneous position of the moving member is determined by measurement and is not predetermined through some programmed means. This particular invention seeks to attain a smooth and uniform scanning velocity utilizing a minimum of drive power. The invention incorporates a conventional roller drive.

U.S. Pat. No. 2,476,496 teaches the use of linear motors in scanning devices, the invention addressing itself in particular to a multipurpose facsimile machine. The driven member moves along a guide rail and terminates against shock absorbing springs. The linear motor in this invention comprises coils in the moving member and alternating magnetic and non-magnetic materials in the guide rail along which the moving member glides with the coils concentric to the guide rails.

U.S. Pat. No. 4,348,697 describes a facsimile apparatus a similar machine which generates signals representing information for more than one scan line during each traversal of the scanning head or carriage.

U.S. Pat. No. 4,764,815 discloses yet another shuttling scanner. This particular invention addresses itself, amongst other aims, to the reduction of the mechanical forces involved in larger and heavier high resolution scanning devices. It seeks to do so by means of springs, either mechanical or air, at either end of the shuttle traverse. In this invention the springs are supported independently from either the scanning head or the platen being scanned.

U.S. Pat. No. 4,750,721 seeks to address the forces that destabilize scanning devices by using a counter weighting approach that seeks to maintain the center of mass of the system as a whole in a fixed position. It does so by means of an intermediate stage operating much like a recoilless system. It also employs a linear motor as drive system.

The above prior art therefore clearly discloses the concept of a scanning device in which at least one of either the platen or the scanning head moves in at least one dimension by a ballistic shuttling motion, the position of the moving part being determined by measurement rather than by driving it to a predetermined position. Means of reducing the mechanical forces on the scanner as a whole, with a view to attaining positioning accuracy, are also disclosed in this prior art.

Within the semiconductor integrated circuit manufacturing industry there are applications requiring extremely accurate positioning of scanning heads and platens. Often these systems are comparatively large, representing significant mass and momentum in their moving parts. Simultaneously this industry has great concern regarding the generation of particulate matter that go directly to the quality of the product being produced. This results in the equipment being placed in Class 10 clean facilities with extreme precautions regarding the generation and disturbance of particulate matter. Any scanning devices generating significant forces whilst executing shuttling actions will therefore run the risk of freeing up such particulate matter and exacerbating the quality concerns. Any equipment containing rigid surfaces that come into contact periodically is undesirable, as such contact generates particulate matter. All prior art exhibits this problem.

There is therefore considerable merit in devising a means of reducing the peak forces required to drive the scanning system. There is also merit in ensuring that neither the traverse nor the execution of the return stroke of shuttling scanners requires physical contact between any bulky parts in mutual motion as such contact would similarly be a source of forces leading to loosened particulate matter and consequent contamination.

Within the printed circuit board industry there is an added consideration that the boards should be scanned on both sides simultaneously, thereby eliminating a costly additional processing step. There is therefore considerable merit in an approach that provides this additional functionality.

In the specific area of the reciprocation of the shuttling part of scanners, the prior art described in U.S. Pat. No. 2,476,496 teaches the use of springs while U.S. Pat. No. 4,764,815 describes the use of either springs or air springs. Both of these devices have shortcomings that lead to excessive forces being generated during the reciprocation process of the shuttling part. In the case of a spring the force in the opposite direction to the motion of the shuttle increases linearly with the compression while in the case of air springs it increases even more rapidly with compression. The result is quite a precipitous stop to the shuttle with resulting high peak forces. There is therefore much merit in devising an alternative means to effect the slowing and turnaround reciprocation of the shuttle carriage of the scanner if this means will lead to lower peak forces during the stroke of the shuttle carriage.

BRIEF SUMMARY OF THE INVENTION

In accordance with the present invention a scanning method for flat plate objects obtains reciprocating ballistic motion without any physical contact between the mutually moving parts. The method ensures that the peak forces attained during scanning are minimized to prevent dislodgement of particulate material. The method furthermore ensures that both surfaces of flat plate objects may be scanned simultaneously.

BRIEF DESCRIPTION OF THE DRAWINGS

FIG. 2 shows a cross-sectional view of the shuttle mounting system perpendicular to the direction of ballistic motion. Air circuit ducts are depicted schematically.

FIGS. 3(a) and (b) show alternative implementations of the reciprocating mechanism for the ballistic shuttle, relying on pressurized air in the case of the former and on springs and air cushions in the case of the latter FIG. 4 shows a shuttling translation system that allows printing two sides of a flexible surface simultaneously

DETAILED DESCRIPTION OF THE PREFERRED EMBODIMENT

Figure 1:
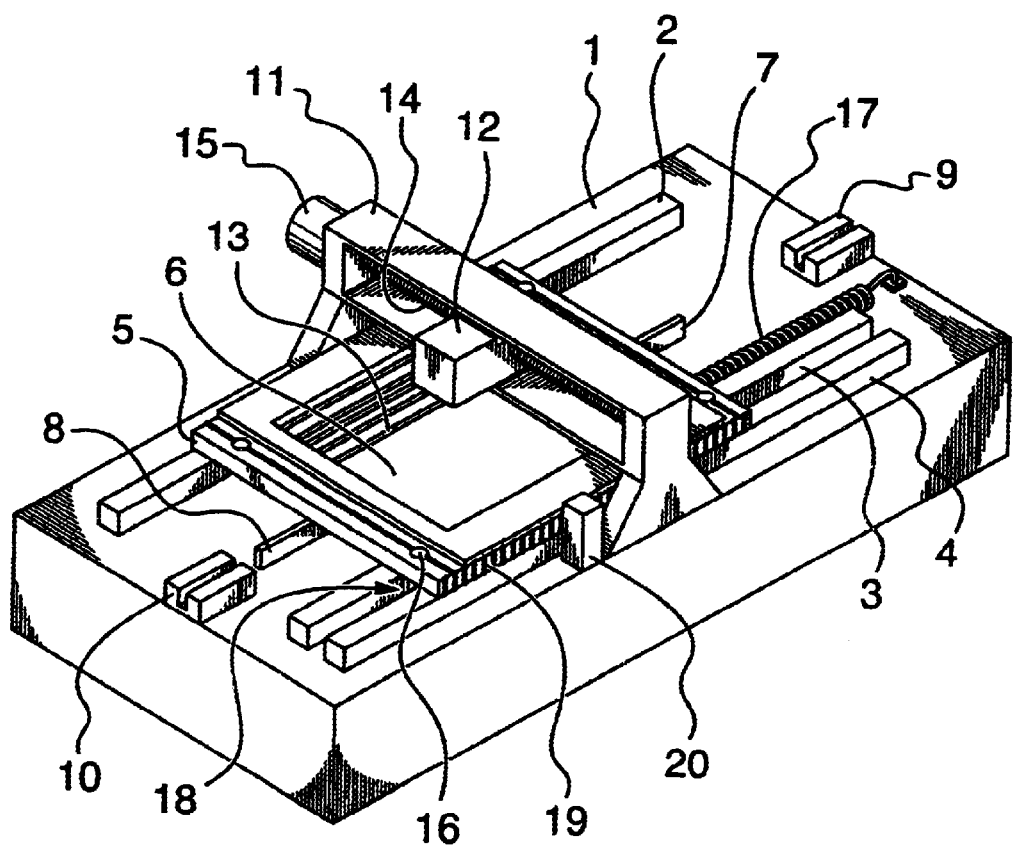
FIG. 1 shows a two-dimensional electromechanically driven shuttling translation stage that embodies the invention

FIG. 1 illustrates the essence of the preferred embodiment of the method disclosed in this invention.

Using a stationary base 1 and air bearing tracks 2, 3 and 4 a shuttle carriage 5 carrying the flat plate object or planar substrate 6 that is being scanned is ballistically shuttled along one axis by a linear motor comprising of permanent magnet armatures 7 and 8 and wound stators 9 and 10. By virtue of the air bearings, depicted in greater detailed in later FIG. 2, the motion of the shuttle carriage is subject to very low frictional losses. By suitable electrical signals supplied to the stators 9 and 10 the shuttle carriage may be started, stopped, slowed, reciprocated, interrupted or otherwise affected in its motion.

The enduring merit of employing a linear motor in this way is that its retarding force can be made largely constant with distance of the armatures 6 and 7 within the coils of the stators 8 and 9. In this respect it differs markedly from the springs and air springs taught by the prior art. This creates far lesser peak forces during the slowing and turnaround reciprocation of the shuttling carriage than is the case with springs or air springs. This then also forms the basis for the invention leading to lesser contamination in that any resident particulate matter in the scanner system will be much less likely to be dislodged in the method described here.

The cross-scanning fixture 11 allows the scanner head 12 to address a swatch 13 of multiple tracks in the shuttling direction on the planar substrate being scanned 6. The scanner head is moved in the direction perpendicular to the shuttle direction by the action of a lead screw 14 driven by a motor 15, or any other conventional means such linear motors, friction drives, metal belts and timing belts etc.

In order to secure the substrate 6 being written to the shuttle carriage 5, a means 16 of attaching the substrate is provided. In this preferred embodiment the preferred means is vacuum, but mechanical means may also be employed.

The pressurized air that is required for various functions depicted in FIG. 2 is fed to the shuttle via a coiled air hose 17 while the lateral motion of the shuttle is constrained in contact-less low friction means which, in the case of this preferred embodiment, is a single vertical air bearing 18. This air bearing may also be viewed in a different aspect in FIG. 2

The position of the shuttle is not preprogrammed and driven, but rather the system uses the shuttling motion to its greatest benefit and simply reads the precise position of the shuttle very accurately from the linear encoder 19 using the encoder readout station 20. This encoder may be either conventional or interferometric as required by the precision specifications of the application. Once linear motors 9 or 10 place the shuttle in motion, the motor is no longer used (in the case of a linear motor the armature may be disengaged) and the shuttle carriage motion is ballistic with the shuttle carriage moving at constant speed.

Referring now to FIG. 2, the shuttle carriage and base 1 are shown in cross-section. A venturi generator 21 is employed to avoid an additional vacuum connection to the moving shuttle. The presence of such a connecting hose will constitute an avoidable encumbrance to the shuttle that is intended to have an little energy loss as possible.

All vacuum and pressure lines 22 and 23 are shown schematically. Pressure circuit duct 23 supplies the pressurized air for horizontal air bearing 24 and vertical air bearing 25. Vacuum pull-down pocket 26 provides the counter-force for balancing the horizontal air bearing 24, the vacuum for this function being routed via duct 22. Vacuum grooves 27, supplied with vacuum by duct 22, hold the substrate 6 being scanned to the shuttle carriage 5. Other methods of substrate hold-down and air bearing counter force can be substituted. Conventional double-side air bearings similar to 18 can also be used instead of single-sided bearings 24 to eliminate the need for counter-force generators 26.

Also depicted in cross-section in this drawing are the linear motor armature 7 and stator 9, the linear encoder 19, and air bearing tracks 2,3 and 4.

A unique aspect of the method disclosed here is that it nowhere requires intermittent physical contact between the shuttle carriage and the base, thereby reducing the transmission of peak forces through the system. The only contact is hose 17, however, this is a permanent connection while particulate material is generated from intermittent contact. Connection 17 can be eliminated, if so desired, by reversing the design of the air bearings, placing pockets 24 along tracks 2,3 and 4 and making members 18 and 5 a smooth passive surface. The penalty is increased air consumption, as some of the pockets will not be covered at all times.

Turning now to FIG. 3-a, we provide an alternative embodiment of the reciprocating device, replacing the linear motor with an air-piston-and-cylinder arrangement. Air pressure supply 28 is routed via an air valve 29, the timing of which is controlled by timing signals from the linear encoder 19 (see FIG. 1 and FIG. 2). Air cylinders 30 are affixed to the base 1 of the scanner (See FIG. 1). Air pistons 31 are affixed to the shuttle carriage 5 (see FIG. 1 and FIG. 2). Unlike conventional cylinders, there is no contact between piston 31 and cylinder 30. This eliminates the creation of particulate matter. At either end of its range of travel the shuttle carriage 5 will cause the relevant piston 31 to enter the air cylinder 30 at that particular end of the base 1. The pressurized air will be switched on or off or to any intermediate value by a control circuit driven by the timing signal from linear encoder 19. In this way the air supply to the cylinders will be shut off when the shuttle carriage is at the opposite end of its stroke or travel and it will be switched on when the piston 31 moves into the cylinder 30 or is sufficiently near it. Manipulation of this air supply and timed switching of the valves 29 allow the motion of the shuttle carriage to be controlled. Since there is no contact between piston 31 and cylinder 30, some air will leak. The low losses of the air bearings require very little energy to be added in each stroke, these losses can be tolerated.

Turning now to FIG. 3-b we depict yet another alternative embodiment of the reciprocating device. In this case springs 32 affixed to base 1 have buffer plates 33 at their ends facing the shuttle carriage 5. The shuttle carriage in its turn has at its ends air bearings 34 fed with pressurized air by duct 23 (See FIG. 2). We do not depict the means to drive the shuttle in this embodiment and either of the previous two means depicted in FIG. 1 and FIG. 2 or in FIG. 3-a may be employed. In this case the shuttle again does not physically contact either the base or the spring buffer plates 33. The air bearing 34 prevents direct contact between the shuttle 5 and buffer plate 33, thus preventing generation of particulate matter In FIG. 4 we depict a further embodiment in which two sides of the flat plate object are scanned simultaneously. This requires the addition of a second scanner head 12A further air bearings 35 and 35A that, together, serve to maintain the flatness of the plate in the vicinity of the area being scanned.

What is claimed is:

1. A method for reciprocating a shuttle carriage comprising:

Placing said shuttle carriage in ballistic motion when not being reciprocated and reciprocation of said shuttle carriage at the end of its traverse in either forward or reverse direction by a contact-less reciprocation means, the force for said reciprocation being applied without any physical contact being made between said shuttle carriage and the fixtures and parts with respect to which it is moving.

2. A method as in claim 1, wherein the instantaneous position of said shuttle carriage is measured and generation of a measurement signal representing said measurement of instantaneous position.

3. A method as in claim 2, wherein said contact-less reciprocation means is controlled using said measurement signal.

4. A method as in claim 1 wherein said contact-less reciprocation means is magnetic.

5. A method as in claim 1 wherein said contact-less reciprocation means is pressurized air acting within a confined space against a non-contacting member attached to the shuttle carriage, said pressurized air supply is controlled by said measurement signal and said pressurized air supply is reduced when not required.

6. A method as in claim 1 wherein the contact-less reciprocation means comprises a spring acting against an air cushion effected on the head of a pad attached to the shuttle carriage.

7. A method as in claim 1 wherein said motion is used for optical scanning of a flat object.

8. A method as in claim 7 wherein said flat object is being scanned on both sides simultaneously.

9. A method as in claim 8 wherein flat objects are scanned on both sides simultaneously while said flat object is being supported by the action of an air bearing from at least one side.

10. An method as in claim 4 wherein said magnetic means are obtained using a linear motor, the linear motor extending over at least part of the length of the traverse of the shuttle carriage and said linear motor being applied selectively to affect the motion of said shuttle carriage as may be required from time to time by the operational status of the shuttle carriage.

11. A method as in claim 10 wherein said linear motor employs permanent magnets.

12. A method as in any of the above claims wherein the scanned object is one of the following: a printed circuit board, a flat panel display, a silicon wafer.

* * * * *